(12) United States Patent
Brown

(10) Patent No.: US 6,522,335 B2
(45) Date of Patent: Feb. 18, 2003

(54) SUPPLYING DATA TO A DOUBLE BUFFERING PROCESS

(75) Inventor: Eric Brown, Montréal (CA)

(73) Assignee: Autodesk Canada Inc., Montreal (CA)

(*) Notice: Subject to any disclaimer, the term of this patent is extended or adjusted under 35 U.S.C. 154(b) by 0 days.

(21) Appl. No.: 09/307,736

(22) Filed: May 10, 1999

(65) Prior Publication Data

US 2002/0190994 A1 Dec. 19, 2002

(51) Int. Cl.[7] .......................... G09G 5/399; G09G 5/36
(52) U.S. Cl. ...................................... 345/539; 345/545
(58) Field of Search ................................ 345/501, 503, 345/520, 530, 534, 536, 539, 545, 548, 556

(56) References Cited

U.S. PATENT DOCUMENTS

| | | | | |
|---|---|---|---|---|
| 5,515,494 A | * | 5/1996 | Lentz | 345/545 |
| 5,519,825 A | * | 5/1996 | Naughton et al. | 345/473 |
| 5,809,228 A | * | 9/1998 | Langendorf et al. | 365/189.05 |
| 5,844,569 A | * | 12/1998 | Eisler et al. | 345/539 |
| 6,108,014 A | * | 8/2000 | Dye | 345/501 |
| 6,285,366 B1 | * | 9/2001 | Ng et al. | 345/853 |

\* cited by examiner

Primary Examiner—Ulka J. Chauhan
(74) Attorney, Agent, or Firm—Gates & Cooper LLP

(57) ABSTRACT

Data is supplied to a double buffering process. New data is supplied to a background buffer for a displayed item. A condition is identified to the effect that the item in a foreground buffer is invalid. On the previous cycle, a similar process may have been performed such that the background buffer contains invalid items. Before swapping the roles of the buffers, any invalid items in the background buffer are validated. In this way, all item transitions appear without artefacts without adding a significant overhead.

32 Claims, 16 Drawing Sheets

| BACK BUFFER | FRONT BUFFER | ACTION | LEFT ITEM STATUS | RIGHT ITEM STATUS | |
|---|---|---|---|---|---|
| | | USER CLICKS ON LEFT ITEM | 2 | 0 | 901 |
| | | REDRAW LEFT ITEM | 1 | 0 | 902 |
| | | SWAP BUFFERS | 1 | 0 | 903 |
| | | USER CLICKS ON RIGHT ITEM | 1 | 2 | 904 |
| | | REDRAW RIGHT ITEM | 1 | 1 | 905 |
| | | REDRAW LEFT ITEM | 0 | 1 | 906 |
| | | SWAP BUFFERS | 0 | 1 | 907 |

*Figure 9*

SUPPLYING DATA TO A DOUBLE BUFFERING PROCESS

FIELD OF THE INVENTION

The present invention relates to supplying data to a double buffering process, in which data is read from a foreground buffer, new data is written to a background buffer and then the roles of the buffers are exchanged.

BACKGROUND OF THE INVENTION

In computer systems and in digital video systems, it is known to produce an output image by means of a video monitor or visual display unit in which digital information is derived by scanning data contained within an array of storage locations. Storage locations of this type are often referred to as frame buffers, and a scanning process in combination with a digital to analogue conversion process are performed in synchronism with the frame rate of the output monitor.

In some systems, a single buffer may be used such that the reading of data to produce an output signal and the writing of new data to provide updates is performed with respect to the same buffer. Under these circumstances, as new data is written to the buffer, artefacts are often generated during intermediate frames, created while the writing process takes place.

In order to overcome the generation of these artefacts, it is known to provide a double buffering scheme in which data is read from a foreground buffer, new data is written to a background buffer and then the roles of the buffers are exchanged. This system works particularly well when displaying frames of moving images such that a new frame of information is written to the background buffer while the previous frame is being read from the foreground buffer.

In computerised systems for manipulating moving images, possibly originating from a video or cinematographic film source, menus and control elements are often included in addition to the display of video material. These elements may be selected and operated upon by means of a manual control device, such as a mouse or stylus. When operated upon in this way, it is conventional practice for the elements to change in some way, thereby recognising the change of state. Often this is achieved by changing the shading characteristics of a displayed button, thereby creating an illusion to the effect that the button has been pressed.

Conventionally, changes of this type are effected in both buffers, such that the foreground buffer is updated while it is being used to generate output material. However, a problem associated with modifying data in this way is that visual artefacts may be introduced while a button is changing state.

It is an aim of the present invention to provide an improved method for supplying data to a double buffering process.

SUMMARY OF THE INVENTION

According to a first aspect of the present invention, there is provided a method of supplying data to a double buffering process, comprising the steps of supplying new data to a back buffer for a displayed item; identifying a condition to the effect that the item in a front buffer is invalid; validating invalid items in a back buffer and identifying a condition to the effect that these items are valid; and reversing the roles of the front and the back buffers.

According to a further aspect of the present invention, there is provided apparatus for updating items on a display, including processing means, instruction storage means and graphical processing means; said graphical processing means including display double buffering means, wherein said processing means is configured to: supply new data to a back buffer for a displayed item; to identify a condition to the effect that the item in a front buffer is invalid; to validate invalid items in the back buffer and identify that these items are invalid; and to reverse the roles of the front and back buffers.

BRIEF DESCRIPTION OF THE DRAWINGS

FIG. 9 illustrates the effect of the steps detailed in FIGS. 7 and 8;

DETAILED DESCRIPTION OF A PREFERRED EMBODIMENT

Figure 1:
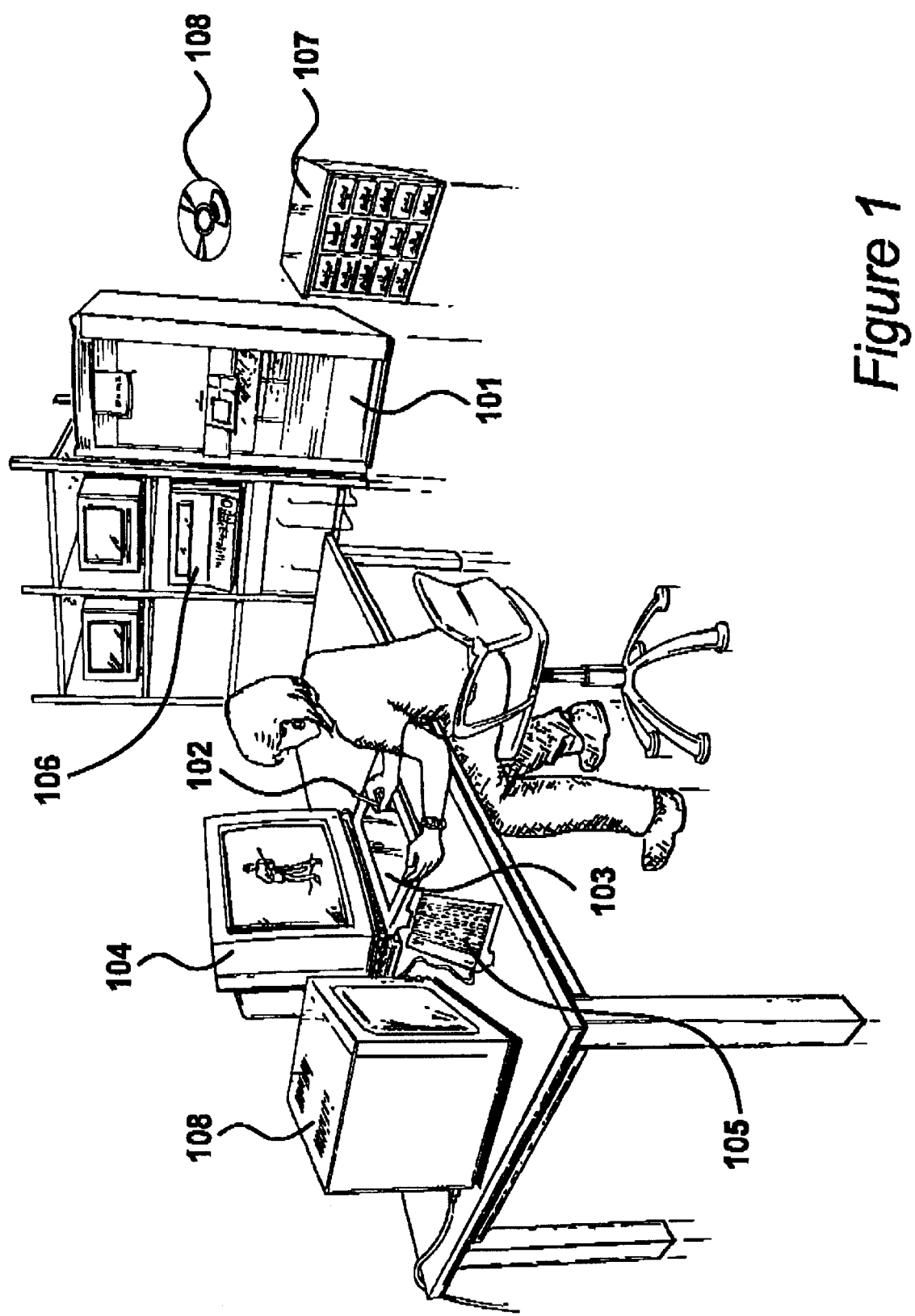
FIG. 1 shows a system for manipulating and processing moving image data, including a processing system and a monitor.

A system for manipulating and processing moving image data is illustrated in FIG. 1. In the system shown in FIG. 1, instructions are executed upon a large graphics-based processing system, such as an ONYX II manufactured by Silicon Graphics Inc. Alternatively, similar equipment such as a Silicon Graphics Octane may be used, depending upon the level of processing required and the size of images being considered.

The processing system 101 receives instructions from an operator by means of a stylus 102 supplied to a touch tablet 103, in response to visual information received by means of a visual display unit 104. In addition, data may be supplied by the operator via a keyboard 105, with input source material being received via a real-time digital video recorder 106 or similar equipment configured to supply high bandwidth frame data, possibly derived by scanning cinematographic film.

The processing system 101 includes internal volatile memory in addition to bulk randomly accessible storage, which is provided by means of a RAID disk array 107. Output material may also be viewed by means of a high quality broadcast monitor 108. With some installations, the equipment is also configured to manipulate audio material and, where appropriate, audio output loudspeakers are provided in the vicinity of the operator.

System 101 includes a CD ROM reader to allow executable instructions to be read from an instruction carrying medium in the form of a CD ROM 108. In this way, executable instructions are installed on the computer system for subsequent execution by the system.

Figure 2:
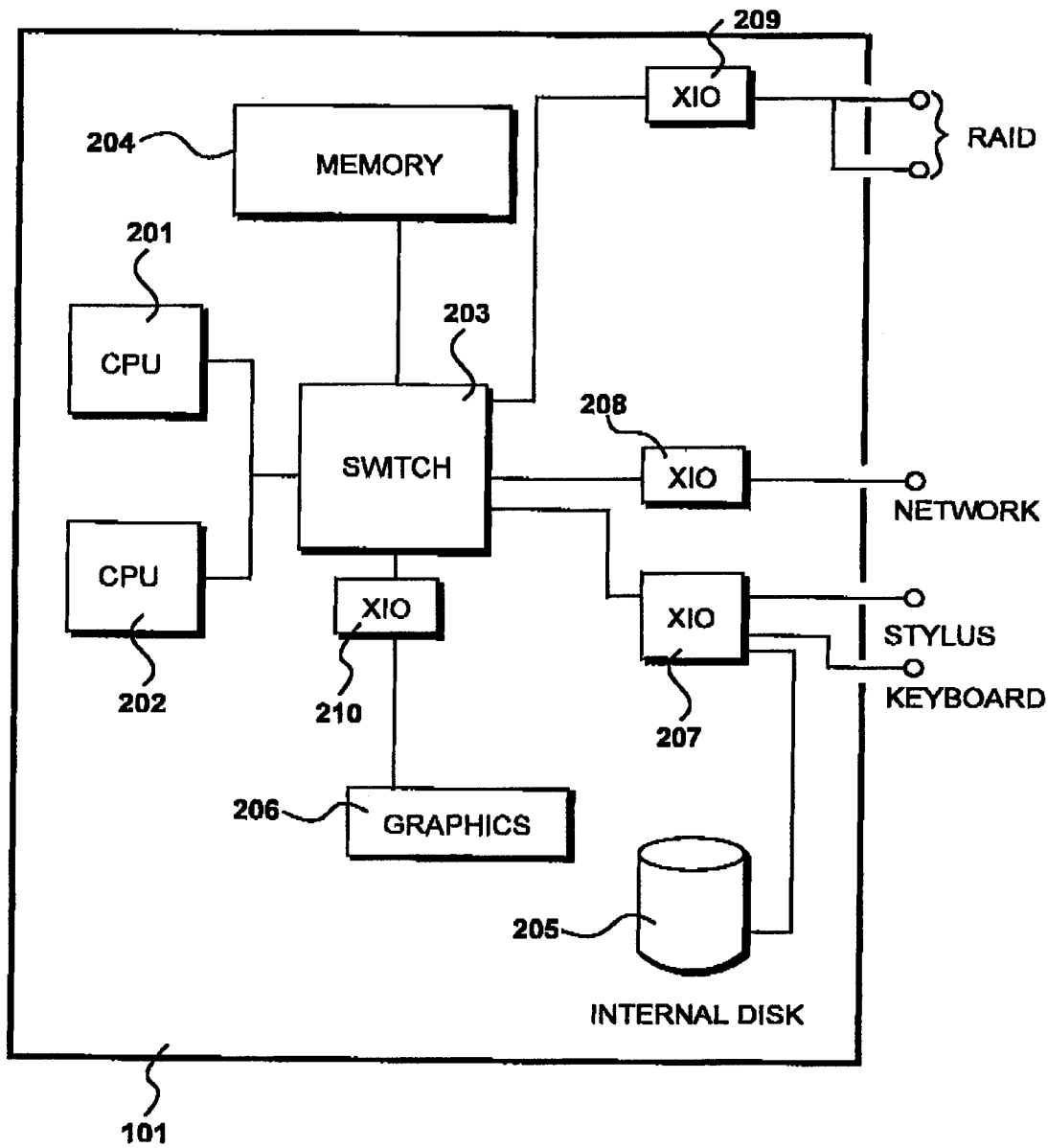
FIG. 2 details the processing system shown in FIG. 1, including memory and a graphics processing circuit.

The internal architecture for the processing system 101 is shown in FIG. 2. The system includes a plurality of processing units 201 and 202, facilitating the execution of multi-threaded instructions as is known in the art. Communication between units within the processing system is facilitated by means of a high bandwidth switching device 203, in preference to a conventional bus structure. This allows the two processors 201 and 202 to communicate with internal volatile memory 204, an internal hard disk storage device 205 and dedicated hardware 206 for the rendering of graphics and audio. The switch 203 is connected to XIO sockets 207, 208, 209 and 210. These sockets are fitted with interface circuits for communication with external devices, such as disk storage array 107 and input devices 102, 103 and 105.

Figure 3:
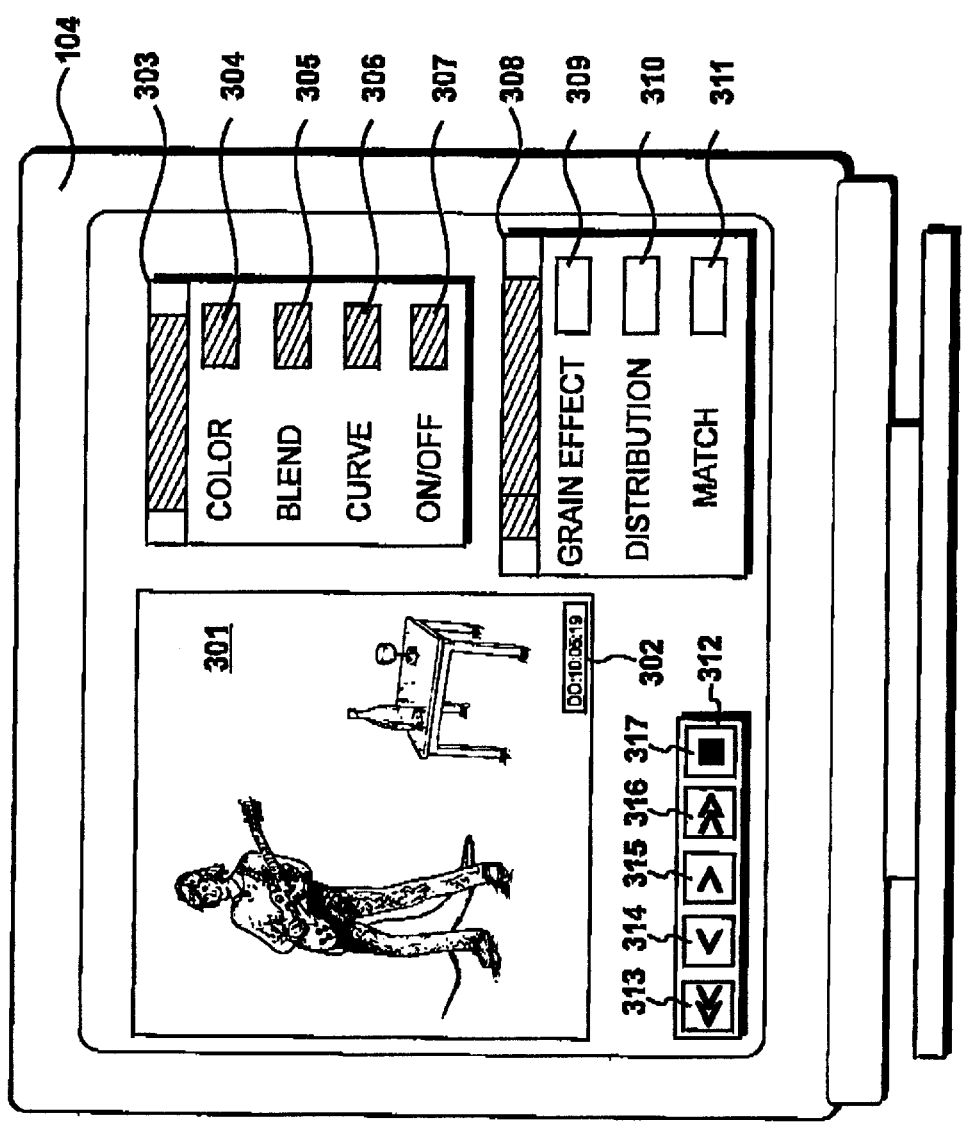
FIG. 3 details image display items of the type displayed on the monitor shown in FIG. 1.

An example of data displayed on the output monitor 104 is shown in FIG. 3. Moving image data 301 is displayed in real time, with frames being updated at a standard SMPTE frame rate, such as twenty-four, twenty five or thirty frames per second. In order to perform editing operations upon the moving image data 301, additional items are displayed, that include items for displaying information, and items that can be operated, in conjunction with a mouse or graphics tablet, in order to control editing operations. A timecode display 302 indicates the time elapsed for the clip of moving image data 301 that is currently being displayed. The time is displayed in the form of numeric fields for hours, minutes, seconds and frame number respectively. In the present example, there are thirty frames per second, although this may differ for different sources of moving image data.

A colour control menu 303 provides a set of buttons for controlling various types of pre-defined colour process for the clip 301. There are four buttons: Colour 304, Blend 305, Curve 306 and On/Off 307. Buttons 304, 305 and 306 provide access to various control menus and interfaces that may be used by the operator to define the type of colour processing effect that is being performed. The On/Off button 307 is used to switch the colour process on or off, thereby enabling a quick comparison to be made with the original unprocessed state of the clip. The status of the On/Off button 307 is indicated by dark shading to indicate the "On" condition.

A Grain Match menu 308 is shown as an additional example of a process which may be applied to the clip 301. This includes a Grain Effect button 309, a Distribution button 310 and a Match button 311. Again, these three buttons may be controlled using the graphics tablet 103 and stylus 102 or a mouse, with the status of the buttons being indicated by their shading.

Transport controls 312 are shown for controlling the playback of the clip 301. These include a fast rewind button 313, a normal speed rewind button 314, a play button 315, a fast forward button 316 and a stop button 317. By operating these controls using the stylus 102, the operator can control the playback of the clip 301. The timecode display 302 is updated automatically with reference to the time of the currently displayed frame.

Figure 4:
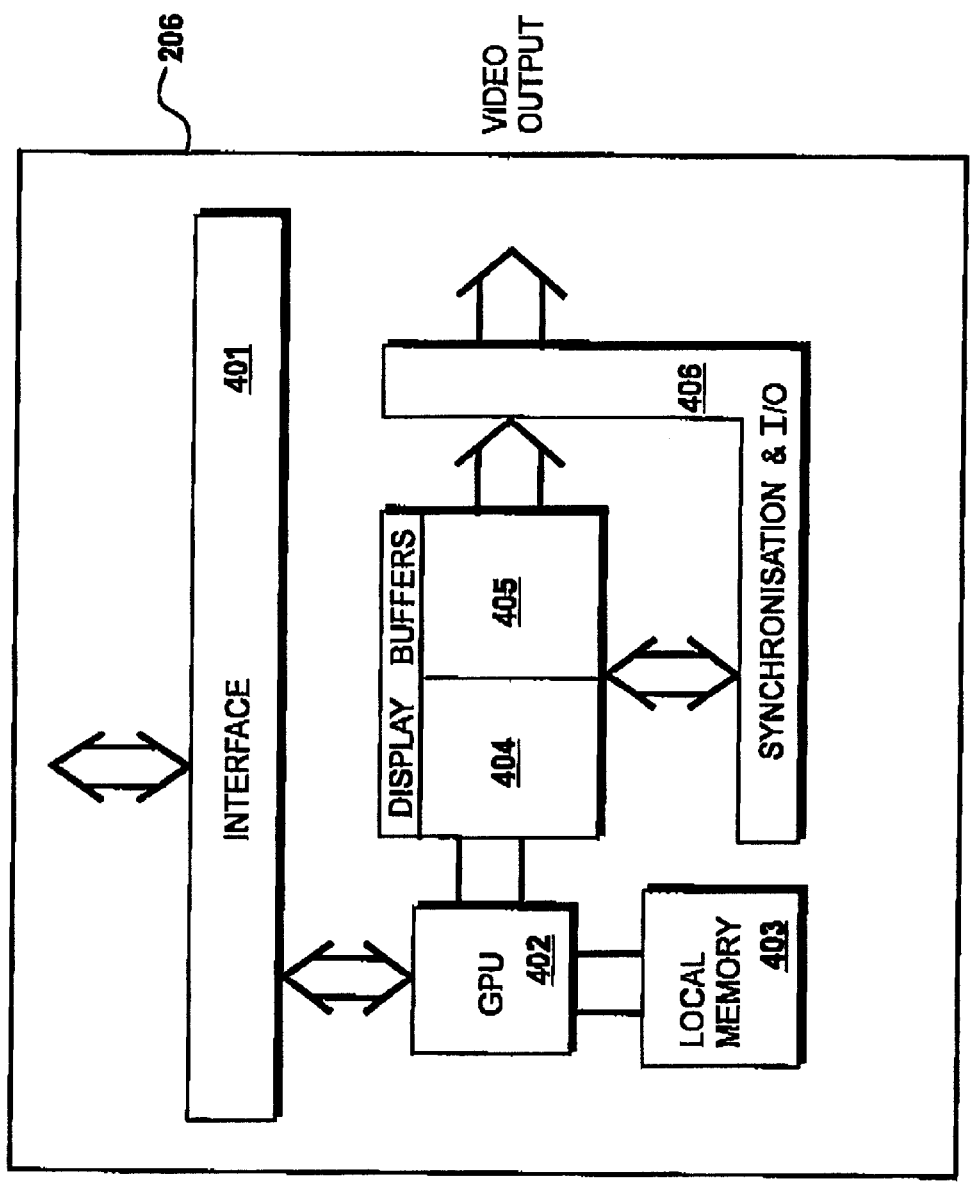
FIG. 4 details the graphics processing circuit shown in FIG. 2.

The graphics circuit 206 shown in FIG. 2 is illustrated in FIG. 4. Addressable interface circuitry 401 connects the internal graphics circuits to the switch 203 in the processing system 101. A graphics processing unit 402 connects with the interface circuitry 401, in order to receive graphics processing commands and associated data from the rest of the processing system 101. Similarly, commands and data may be supplied to the processing system 101, usually in the form of acknowledgement commands, and status data. However, the main processing system is able to interrogate the graphics processing system in order to determine information about current processing status, and the contents of memory locations used by the graphics processor 402. The graphics processing unit 402 includes local memory 403, which may be used to store data structures that will be translated into displayable data.

In addition to local memory 403, the graphics processing unit 402 also connects to a pair of display buffers 404 and 405. Either of these display buffers 404 or 405 may be configured as the front or the back buffer. Taking, for example, the situation when buffer 404 is the back buffer and buffer 405 is the front buffer, new graphics commands and data received by the graphics processing unit 402 will result in new pixel data being written to the back buffer 404, while current pixel data is supplied from the front buffer 405 to the monitor 104. Synchronisation and input/output circuitry addresses memory locations in the front buffer 405 at a time corresponding to the raster scan position of the monitor 104. Thus, the contents of the front buffer 405 are constantly scanned and supplied as output signals corresponding to individual pixels on the monitor 104. The front buffer 405 is scanned in this way for one or a number of frames, until a request is issued by the graphics processing unit 402 to swap the front and back buffers. A swap command is usually issued once new display data has been written to the back buffer 404. Then the roles of the buffers are reversed, with buffer 404 being the front buffer and buffer 405 being the back buffer. The swap is timed to occur during the vertical retrace period of the monitor 104, thus ensuring that no flicker occurs. Typical monitor frame rates are in the order of sixty hertz, depending on the monitor's capabilities. In general, the faster the frame rate, the higher the resulting quality, as the eye is less able to see any screen flicker.

Typical frame rates for the clip 301 are thirty frames per second or less. A lower frame rate may be used during editing in order to conserve processing resources. Thus, in typical operation, if simply displaying a clip, the front and back buffers will be swapped once for every two or three monitor frame periods. However, if additional display items are to be displayed synchronously and without flicker, such as user operated buttons 313 to 314, for example, considerable additional processing resources are required if these also are to be displayed without flicker whenever the display needs updating.

In known systems, additional display items such as the colour control menu 303, grain match menu 308 and transport controls 312 may be written directly to the front buffer whenever they are changed, so as to ensure an immediate response to a user input. However, it is possible that the buffers will need to be swapped before redrawing is complete, in order to maintain the required frame rate, and this will result in the need for the redraw of the item to be started again. The effect of this is an undesirable flicker of the item as it is redrawn partially, and then disappears entirely, and then is redrawn fully before the next swap occurs. On the subsequent swap, however, the incompletely redrawn item will reappear in the front buffer. This is a complex situation to control, especially when many items are being updated by the user, or automatically in response to machine generated events, such as the time-code display 302, and furthermore, results in an undesirable flicker of displayed items.

Further complications arise when items are drawn on top of the clip area 301, such as menu 303. A simple solution to these problems is to redraw all items into the back buffer for each new frame. This, however, is extremely processor intensive, and results in a large number of unnecessary updates to areas of the display that have not actually changed.

Figure 5:
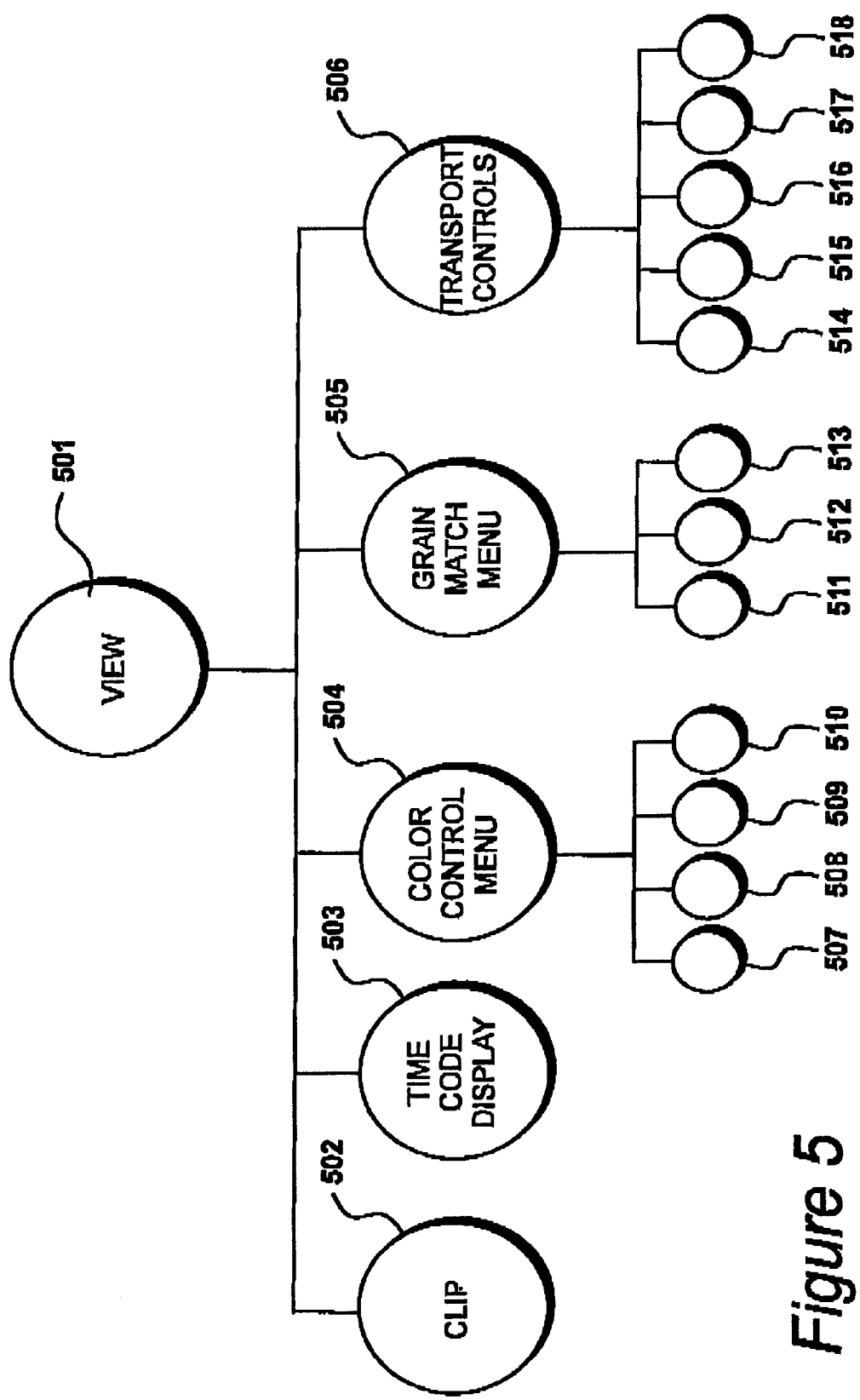
FIG. 5 shows a dependency graph of the type used to represent display items that will be displayed in the form illustrated in FIG. 3.

Data structures used by the processing system 101 to draw the display indicated in FIG. 3 are shown in FIG. 5. These data structures are stored as a dependency graph within the memory 204 of the processing system. The whole display is represented as a top tree node called a view 501. The view is divided into items, each of which may be further subdivided. A first item is the clip player 310 itself, represented in the tree as node 502. The time code display is represented as the next node 503. The colour control menu, grain match menu and transport controls are each represented by nodes 504 to 506 respectively. The display of these items is prioritised from left to right. The clip node is at the far left, resulting in the clip 301 being drawn first. This is followed by the time-code display 302, represented by the next node 503, and so on, reading from right to left in the horizontal line of the tree structure. This results in the time code display 302 being drawn on top of the clip 301, and other items being drawn on top of these. Each of the items 504, 505 and 506 has child nodes 507 to 518, representing individual items that may be updated. In the present example, each of the nodes 507 to 518 represents a button. For example, each of the buttons 313 to 317 in the tape transport controls may be updated separately, but there may be instances when the whole tape transport control needs to be updated, for example, when it is moved.

Figure 6:
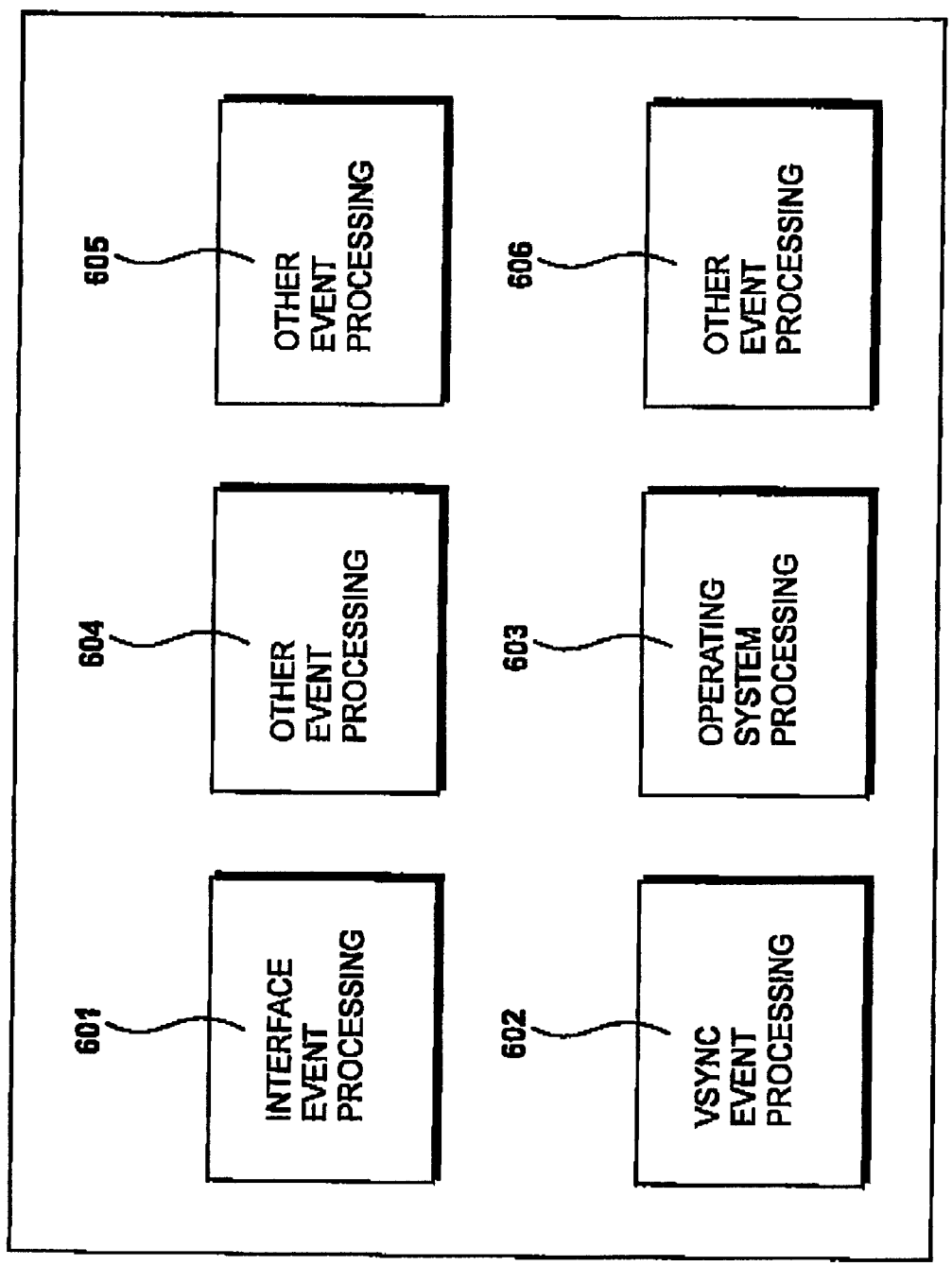
FIG. 6 illustrates event processing performed by the processing system shown in FIG. 1, including interface event processing and vertical synchronisation event processing.

The data structure shown in FIG. 5 is operated upon by the processing system in response to a plurality of processes that handle various types of events. The multiple event handling process environment is illustrated in FIG. 6. Interface event processing 601 includes processes for updating the dependency graph in response to either user operations, such as movement of the stylus 102 on the graphics tablet 103, or operations of the keyboard 105. An example of this type of user-generated event is the activation of the grain effect button 309 shown in FIG. 3. Another type of interface event is that which is generated automatically by another process. For example, an update of the frame counter 302 is performed in response to a timer event generated by another process. This same timer event will also be used to control a number of synchronised processes. Interface event processing frequently requires an update of the dependency graph shown in FIG. 5.

Vertical synchronisation event processing is represented by process 602. This processing includes swapping of the front and back buffers in the graphics circuit shown in FIG. 4, which will be performed automatically when the synchronisation circuitry 406 generates the VSYNC signal, and the buffer swap flag has been set. Internal timing signals, such as those used for the frame counter 302, may be generated in response to the vertical synchronisation signal, and this processing is included in process 602.

Other event processes are shown at 604, including processes for interacting with the dependency graph shown in FIG. 5. Operating system processing 603 includes controlling the several threads and processes that are operating on the processing system 101, and other event processing is indicated at 605 and 606.

Figure 7:
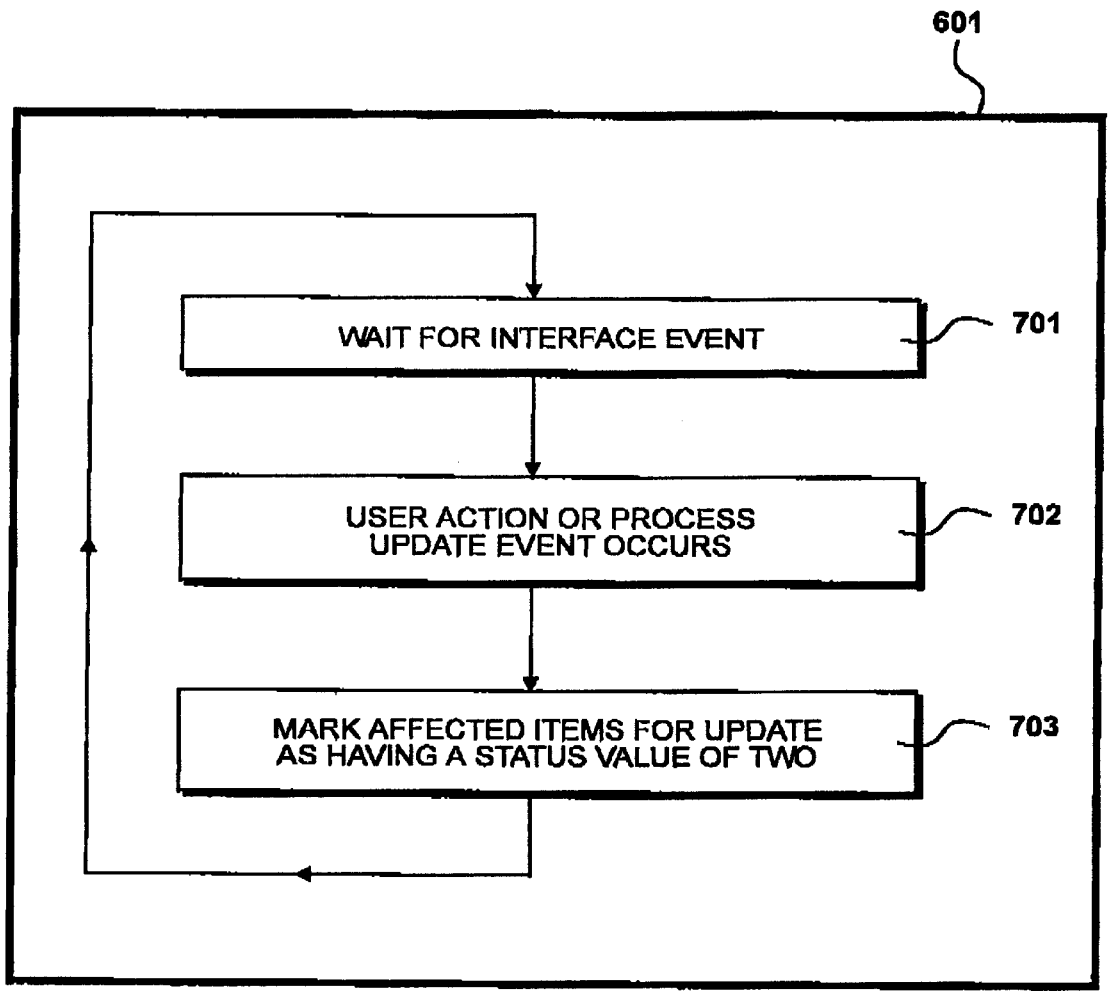
FIG. 7 details the interface event processing shown in FIG. 6, in accordance with a first embodiment of the present invention.

Interface event processing 601 shown in FIG. 6 is detailed in FIG. 7. At step 701 the process waits for an interface event. At step 702 a user action or process update event occurs, for example a button press, or the update of the frame counter 302. At step 703, the items in the dependency graph that are affected by the interface event are marked for update. Each item in the dependency graph stores a status, that is usually zero. When an affected item is marked for update, this includes changing a status value for that item to the value of two. Furthermore, in order to improve the efficiency of other processing of the dependency graph, the dependency graph includes a flag for the view node, which is set when any change has been made to the dependency graph. Marking items for update in this way ensures that only those items that need to be redrawn will be redrawn, thus avoiding unnecessary processing of drawing commands. After step 703, control is directed back to step 701. Sometimes user events occur in rapid succession, for example, when dragging an icon across a screen. When this occurs, by the time the process has returned to step 701, several events may already be queued, and steps 701 and 702 may be omitted.

Figure 8:
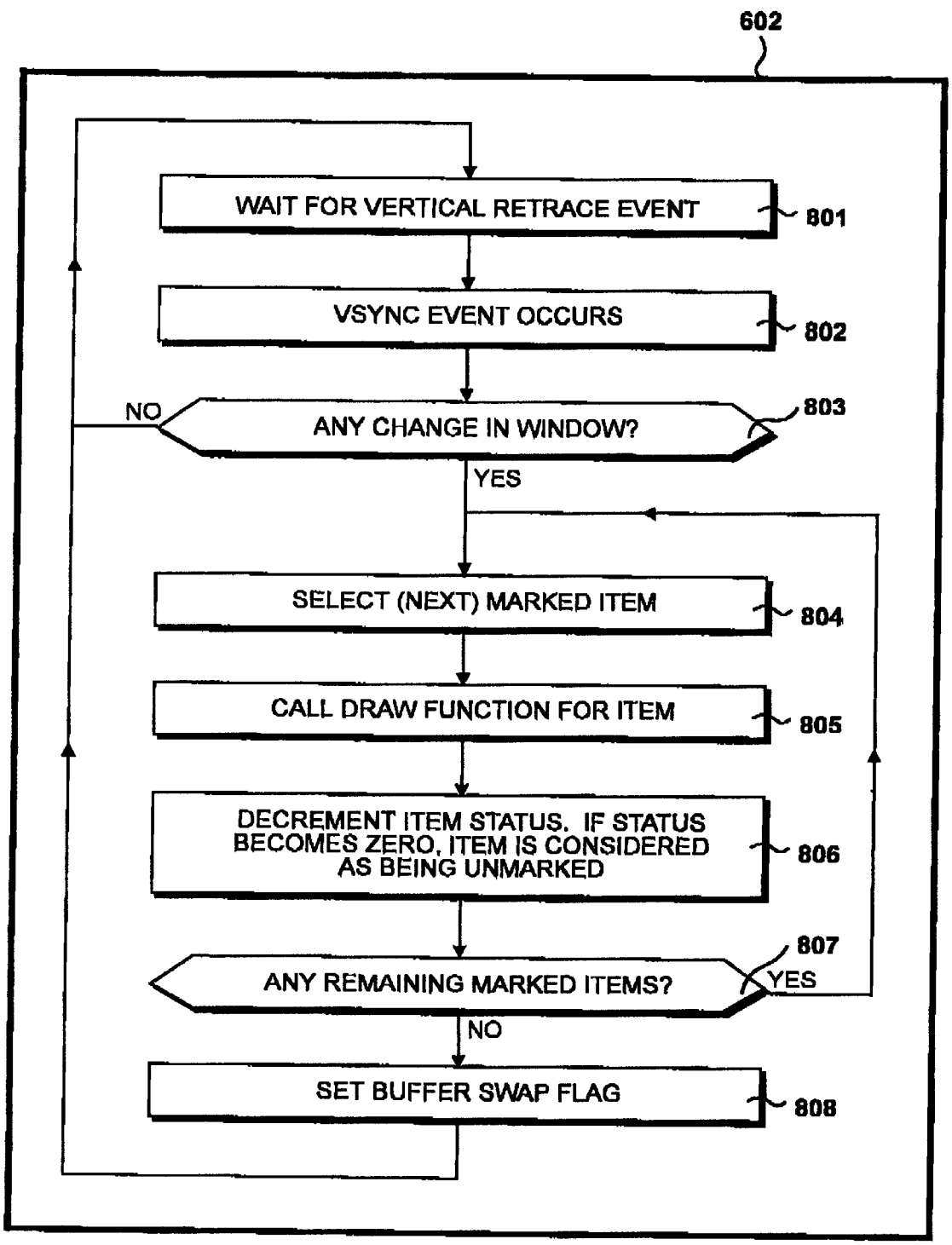
FIG. 8 details the vertical synchronisation event processing shown in FIG. 6, in accordance with a first embodiment of the present invention.

Vertical synchronisation event processing 602 is detailed in FIG. 8. At step 801 the process waits for the next vertical retrace event. At step 802 the VSYNC signal generates a VSYNC event within the processing system. In the graphics card, this may result in swapping of front and back buffers. The maximum amount of drawing time is provided by starting drawing to the back buffer as soon as a VSYNC event occurs. At step 803 a question is asked as to whether there are any changes in the window. This question is answered by examining the view node 501 in the dependency graph. This node stores a flag that indicates whether or not any changes have been made to the dependency graph. If this flag is clear, the question asked at step 803 is answered in the negative, and control is directed back to step 801. At step 804 a marked item is selected. At step 805, the draw function for the item is called. This results in commands being issued to the graphics circuit to draw the item in the back buffer. At step 806 the item's status is decremented. If the item's status has been decremented to zero, it is considered as being no longer marked.

At step 807 a question is asked as to whether there are any remaining marked items in the dependency graph. If there are any remaining marked items, control is directed back to step 803, where the next marked item is selected for consideration. Attentively, control is directed to step 808, where the buffer swap flag in the graphics circuit is set. This ensures that on the next VSYNC pulse, the new image that has been drawn as a result of step 805 will be displayed. The buffer swap flag is automatically cleared once the front and back display buffers have been swapped.

The result of executing the steps shown in FIGS. 7 and 8 is shown in FIG. 9. In this example, two items are being displayed. At step 901 the user clicks on the left item shown in the display. The left item's status is set to two, indicating it is no longer valid in either the front buffer or the back buffer. The right item remains valid in both buffers, and therefore retains the status value of zero. At step 902 the left item is redrawn in the back buffer as a result of step 805, and its status is decremented as a result of step 806. At step 903 the buffers are swapped. The redrawn left item is now shown in the front buffer. However, the left item is now invalid in the back buffer. This does not matter for the time being, until another update is required.

At step 904 the user clicks on the right item, whose status then goes up to two. At step 905 the right item is redrawn in the back buffer as a result of step 805 and its status is decremented to one at step 806. However, the left item has a status of one, and so at step 906 the left item is also redrawn and its status decremented to zero, indicating it is now valid in both front and back buffers. Finally, at step 907, the front and back buffers are swapped.

As shown in FIG. 8, the invention provides a method of supplying data to a double buffering process, comprising the steps of: supplying new data to a back buffer for a displayed item, identifying a condition to the effect that the item in a front buffer is invalid, and validating invalid items in the back buffer and identifying a condition to the effect that these items are valid. Thereafter the front and back buffers are reversed, with the indication of invalid items in the front buffer now relating to the invalidity of those items in the back buffer. The invalid items in the back buffer need only be redrawn once an item in the front buffer, usually the clip, becomes invalid.

The present invention results in reduction in the processing required to provide a flicker free display of display items, especially when such items include real time video mixed with icons, buttons and so on. There may be instances when a particularly fast update of an item is required in response to a user input. Under these circumstances, it is possible for an item to be drawn directly into the front buffer, so that it appears without waiting for a VSYNC pulse. Selected items may be flagged in such a way as to ensure that they are updated in this way. The status is then reduced appropriately, with the result of a simultaneous redraw in both front and back buffers being a status of zero; both front and back versions of the item are now valid. By selecting the mode of redraw in accordance with the speed requirements for a particular item, the advantages of reduced processing are maintained, but high speed for items that require it can also be provided when necessary.

Figure 10:
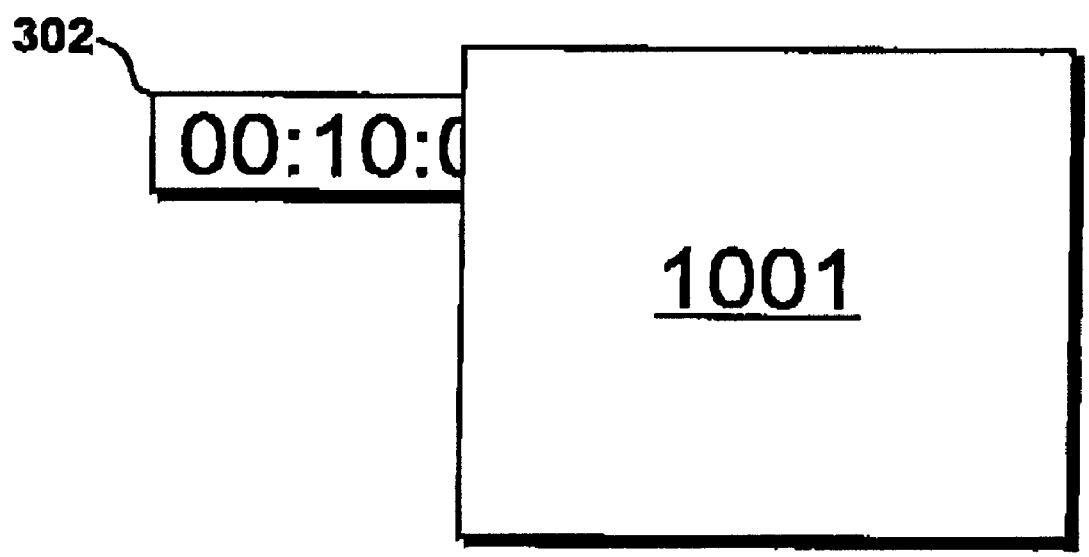
FIG. 10 illustrates the effect of obscuring an area of an item to be updated, that illustrates an aspect of a second embodiment of the invention.

In an alternative embodiment, selected areas of items are redrawn, in preference to an entire item. An example is shown in FIG. 10, where a display item 1001 partially obscures the timecode display 302. Most of the time it will be unnecessary to redraw the timecode display, as the digits that usually change, in the frame number, are obscured by the display item 1001. Thus, although a condition will be detected to the effect that the timecode display has changed, it is preferable not to redraw it unless the part of it that has changed is actually visible.

Figure 11:
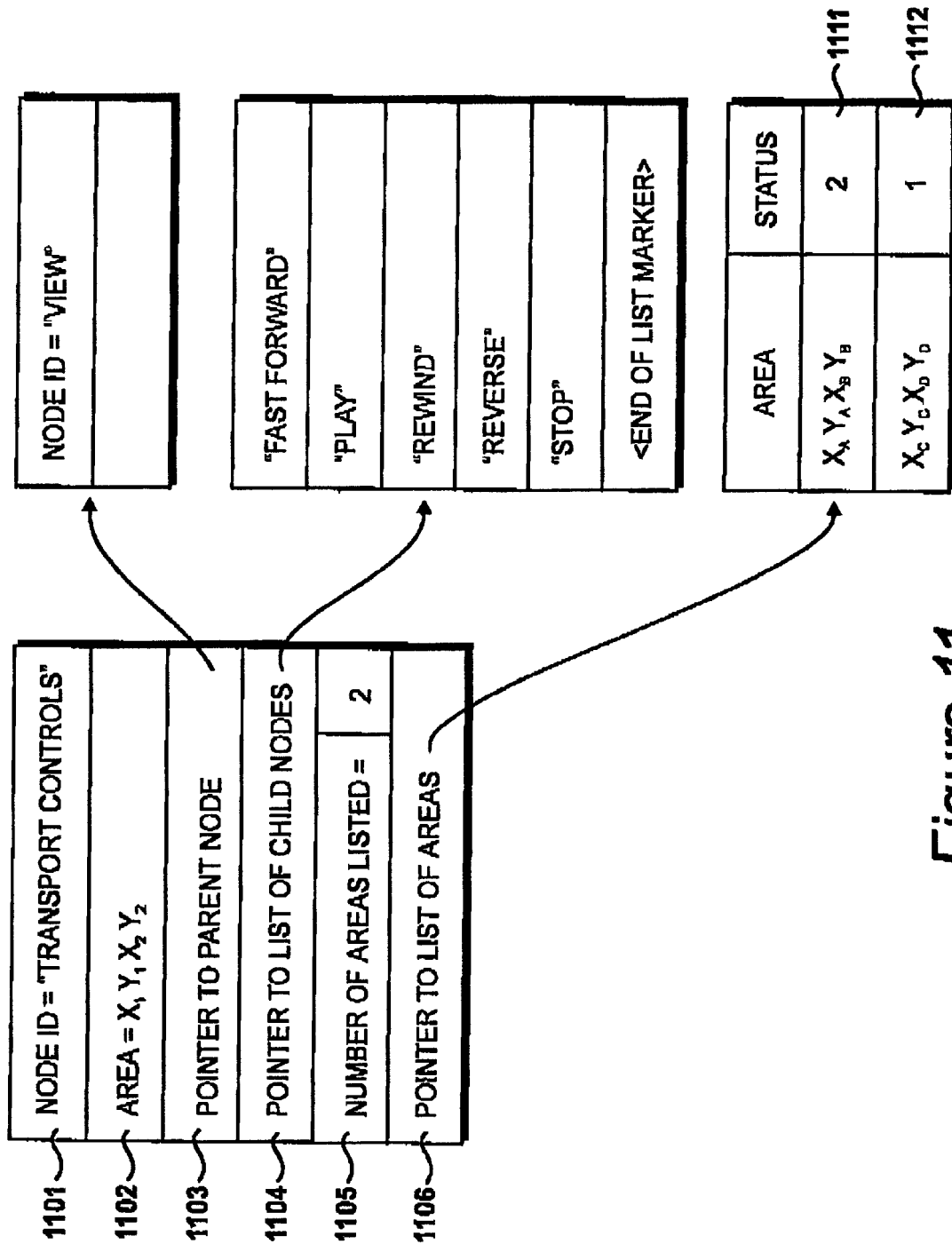
FIG. 11 details data structures in the memory shown in FIG. 2 used to implement a second embodiment of the present invention.

In the embodiment for dealing with item areas that have changed, the dependency graph shown in FIG. 5 includes data structures illustrated in FIG. 11. Each node includes a node identity 1101, a node area 1102, that is used for clipping, a pointer to a parent node 1103, a pointer to a list of child nodes 1104, a record of the number of areas listed, 1105 and a pointer to the first of a list of areas 1106. In the example shown, the "transport controls" node has two areas 1111 and 1112 listed for update, each of which has a corresponding area status. Areas are only listed when an area is not valid in both front and back buffers.

Figure 12:
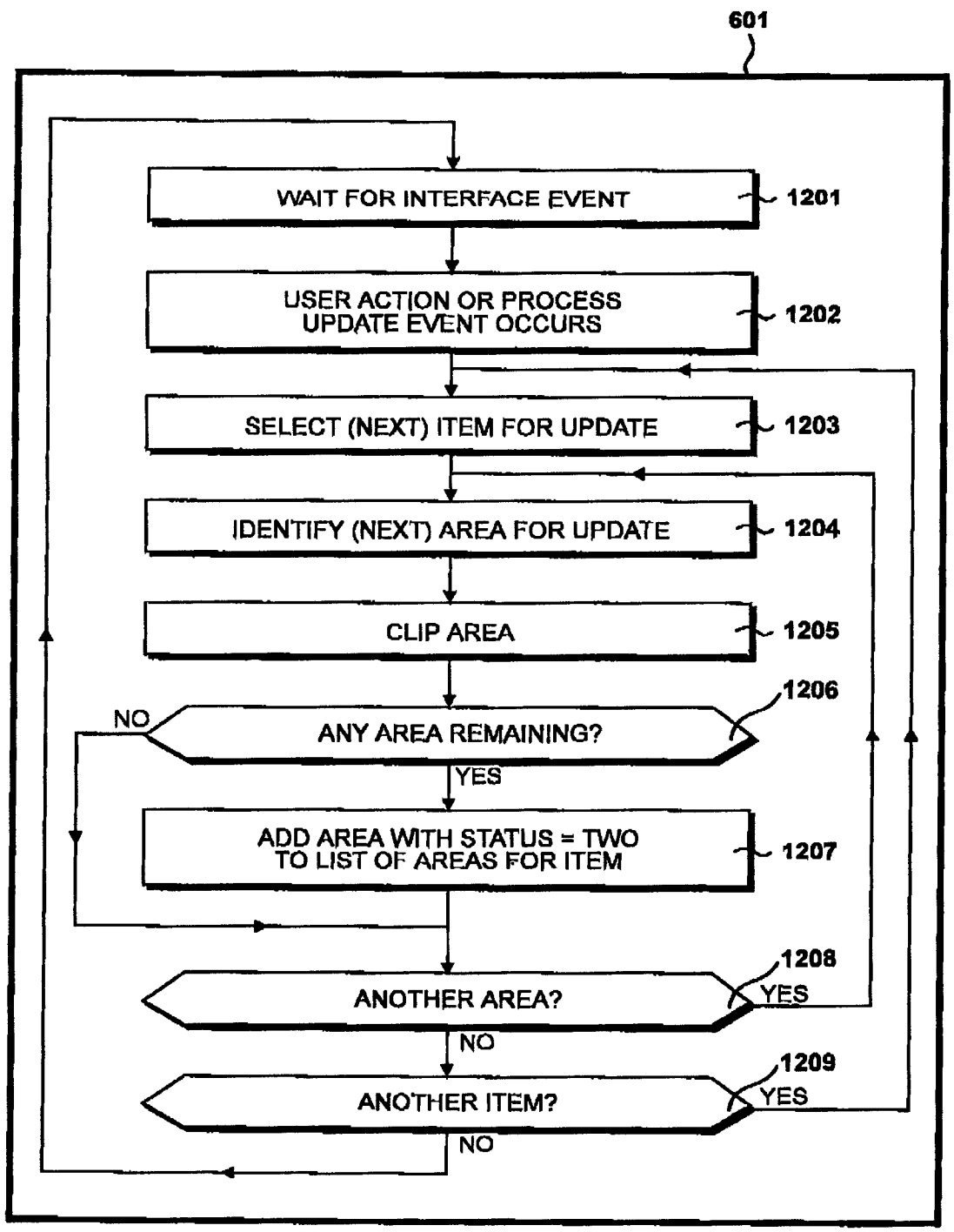
FIG. 12 details the interface event processing shown in FIG. 6, in accordance with a second embodiment of the present invention, including steps of clipping an area and adding an area to a list of areas.

FIG. 12 details the alternative embodiment of the processing of interface events 601. By identifying areas of items that need to be redrawn, the amount of redraw processing required can be further reduced. The steps of FIG. 12 operate with respect to a dynamic list of areas for each item, each area in each list having its own independent status.

At step 1201 the process waits for an interface event. At step 1202 a user action or process update event occurs. At step 1203, the next item affected by the interface event or events at step 1202 is selected. At step 1204 an area for update within the affected item is identified. It is possible for more than one area in an item to be affected. At step 1205 the area identified at step 1204 is clipped. With reference to the example given in FIG. 10, if the area identified at step 1204 is the frame number of the timecode 302, then clipping the area at step 1205 will result in no area being left, as the affected area of the timecode display that would change is entirely obscured by the item 1001 in front. At step 1206 a question is asked as to whether there is any area remaining after area clipping. In the present example, there would be no remaining area, and control would be directed to step 1208. Alternatively, if there is some area remaining, control is directed to step 1207. At step 1207 the remaining area is added to the list of areas for the currently selected item, and the area is assigned a status value of two. At step 1028 a question is asked as to whether any other areas in the currently selected item need to be considered. If so, control is directed back to step 1204. Alternatively, control is directed to step 1209, where a question is asked as to whether any other items have been identified for update. If so, control is directed back to step 1203. Alternatively, control is directed back to step 1201, where it is possible a number of interface events have been queued while processing steps 1203 to 1209; in which case several more items will be processed as described. Eventually, a condition will be reached when all interface events have been considered, and the process will remain at step 1201 until the next interface event occurs.

Figure 13:
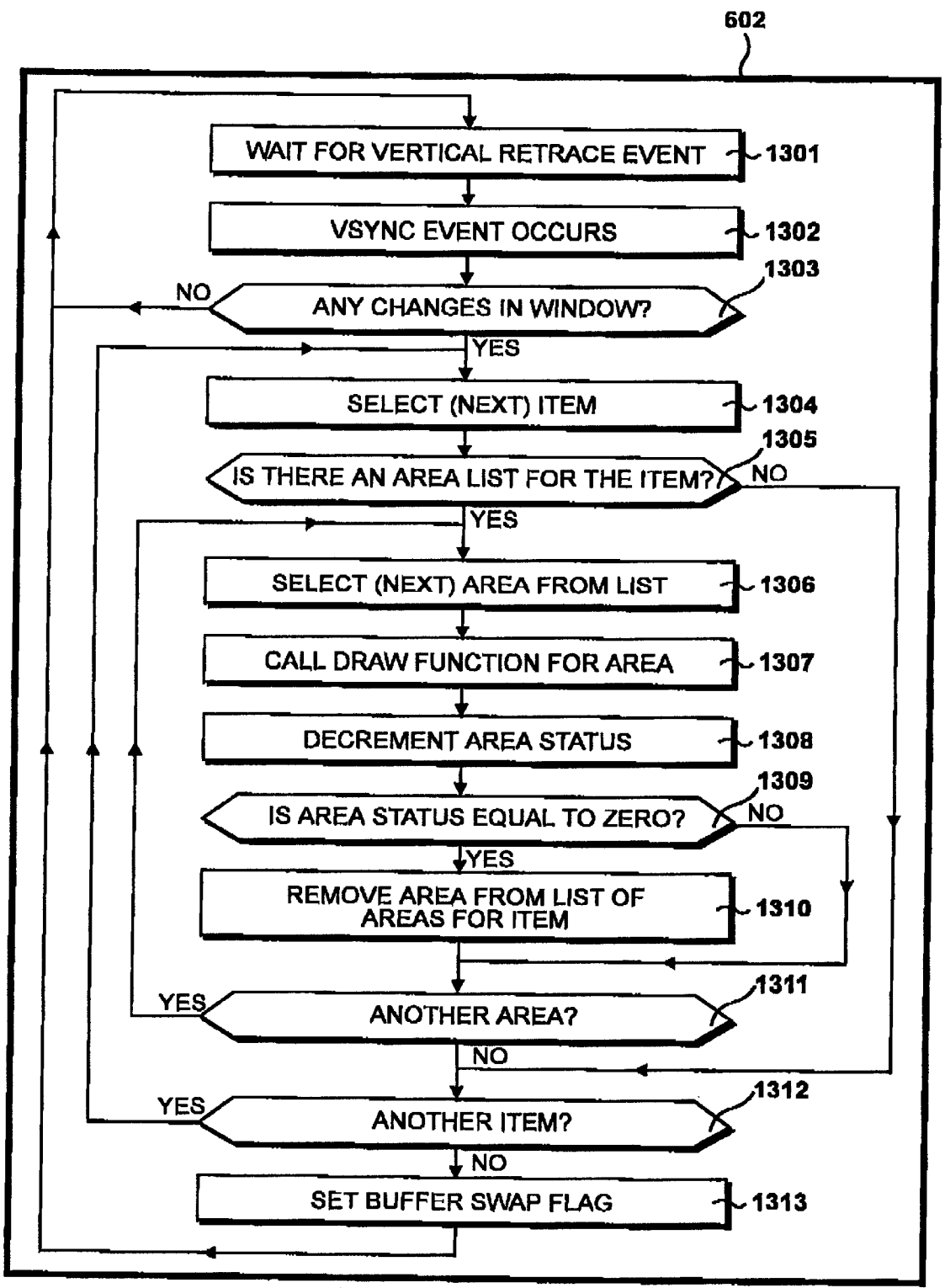
FIG. 13 details the vertical synchronisation event processing shown in FIG. 6, in accordance with a second embodiment of the present invention.

Vertical synchronisation event processing 602 for the alternative embodiment is detailed in FIG. 13. At step 1301 the process waits for the next vertical retrace event. At step 1302 the VSYNC signal generates a VSYNC event within the processing system. At step 1303 a question is asked as to whether there are any changes in the window. If not, control is directed back to step 1301. Alternatively, control is directed to step 1304, when the first of a list of marked items is selected. At step 1305 a question is asked as to whether there is an area list for the item. If not, all of the areas affected by the update have been clipped, and so there is no draw processing required for that item. Under these circumstances, control is directed to step 1312. If an area list does exist for the item, control is directed to step 1306, where the first of the listed areas is selected for redraw. At step 1307 the draw function is called for the selected area. At step 1308, the status for the area is decremented. At step 1309 a question is asked as to whether the area's status has been decremented to zero. If not, control is directed to step 1311. If the area's status is now zero, this indicates that it is now valid in both front and back buffers, and it is removed from the area list at step 1310. At step 1311 a question is asked as to whether there are any other areas remaining for consideration within the list of areas for the currently selected item. If so, control is directed back to step 1306. Alternatively control is directed to step 1312, where a question is asked as to whether there are any other marked items to be considered. If so, control is directed to step 1304. Alternatively, control is directed to step 1313, where the buffer swap flag is set, indicating that the contents of the back buffer have been redrawn and may be swapped to the front buffer on the next VSYNC signal. Thereafter, control is directed back to step 1301, where the process waits until the next VSYNC signal.

Figure 14:
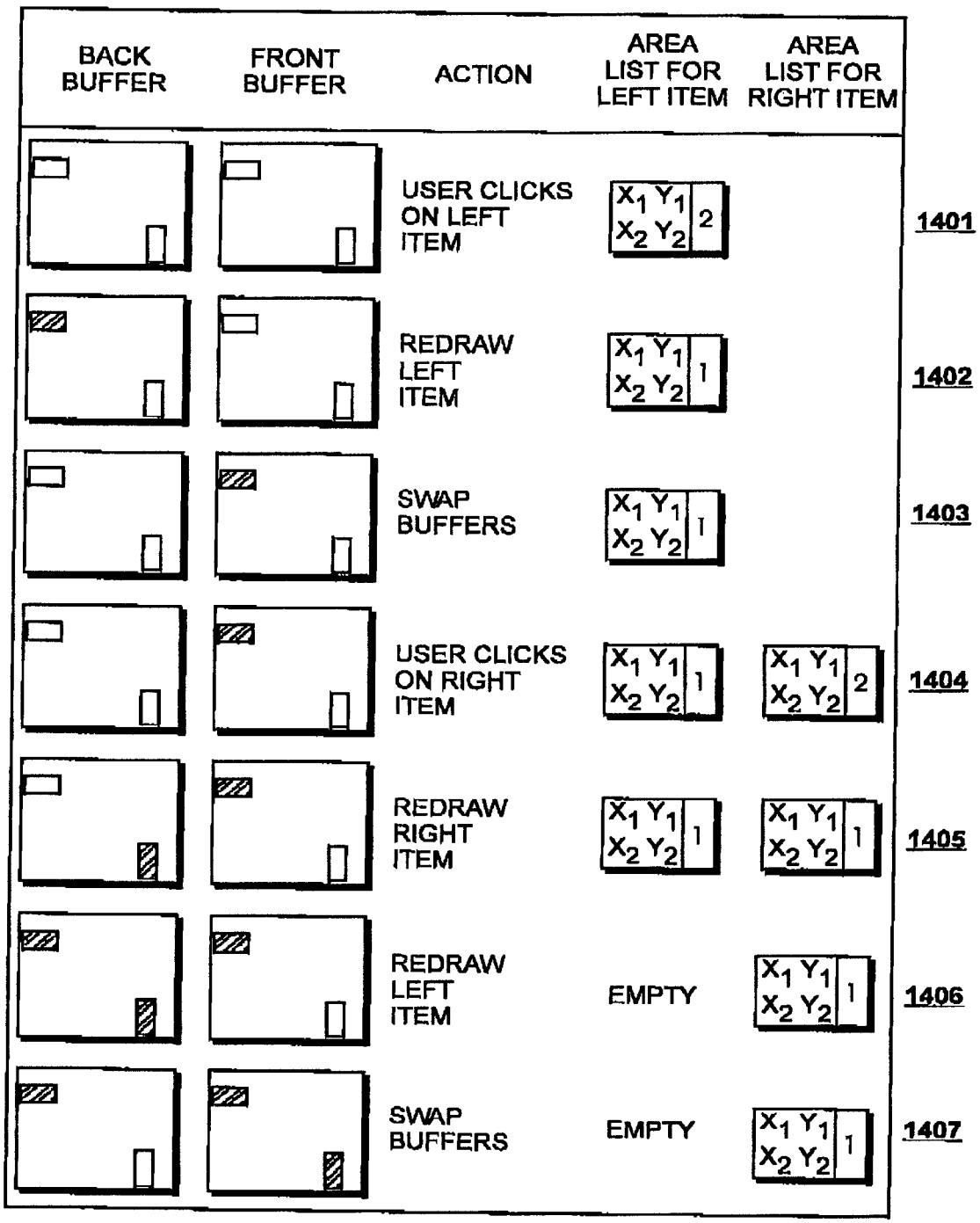
FIG. 14 illustrates the effect of the steps shown in FIGS. 12 and 13.

The result of performing the steps shown in FIGS. 12 and 13 is shown by example in FIG. 14. At step 1401, the user clicks on the left item. In this simple example, the whole area of each item changes as a result of a click, but it is possible to imagine examples where only a portion of the item needs to be updated. As a result of clicking on the item, an area is identified for update and added to the list of areas for the item that are to be updated. In this case, only one area is listed, as the item's whole area was previously valid in both front and back buffers. The area list for the right item remains empty. At step 1402 the left item's affected area is redrawn, by step 1307, in the back buffer, and its status is decremented to one by step 1308. At step 1403, the front and back buffers are swapped. No areas are listed for the right item at this stage, so there are no status values to decrement.

At step 1404 the user clicks on the right item, resulting in an area being added to its previously empty list of areas, and assigning a status of two to this area. At step 1405 the right item is redrawn in the back buffer, resulting in the status of its redrawn area being reduced to one. At step 1406 the left item's listed area is redrawn in the back buffer, and its status is decremented to zero, resulting in the area list becoming empty. At step 1407 the front and back buffers are swapped.

Figure 15:
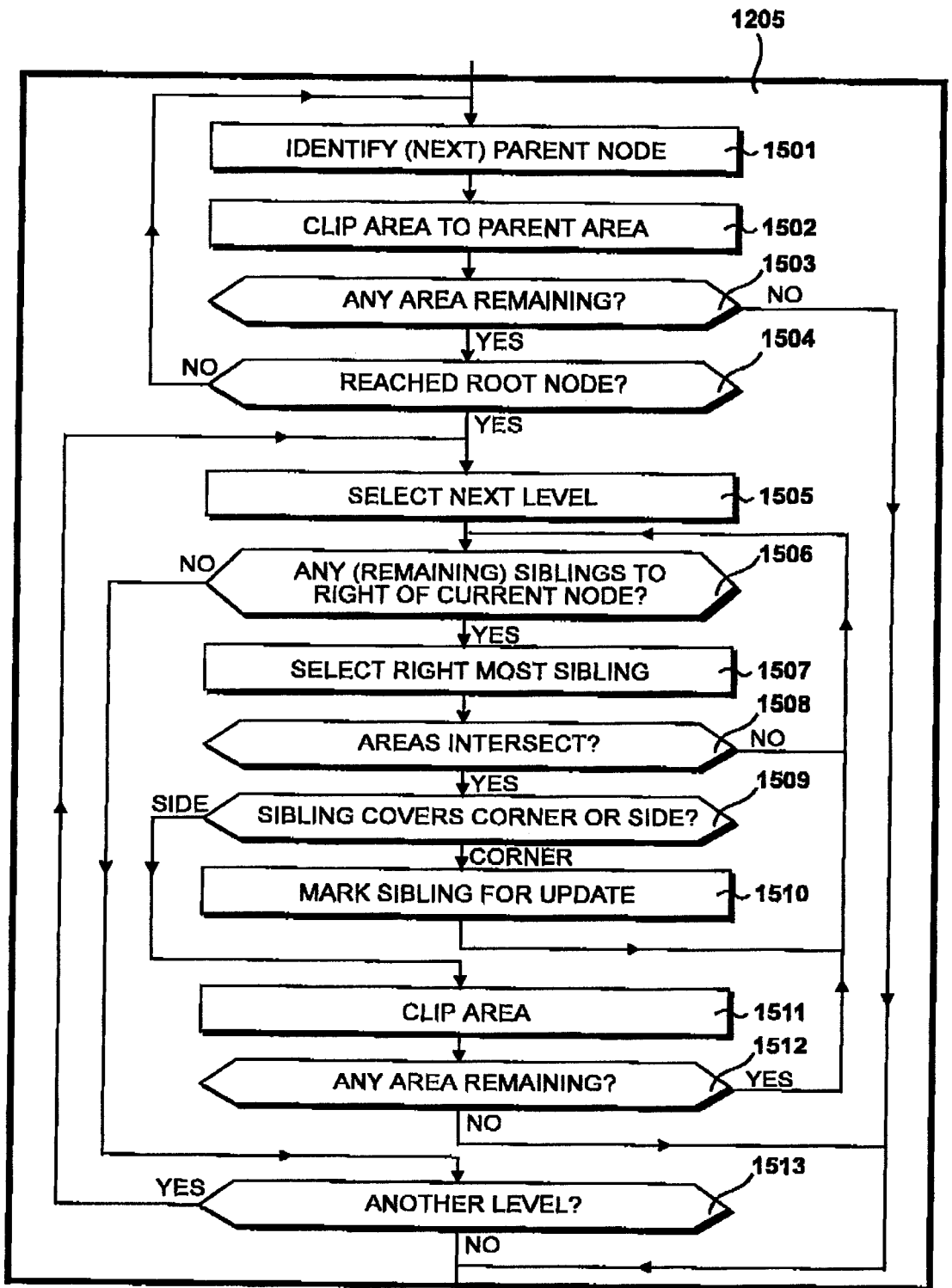
FIG. 15 details the step of clipping an area, shown in FIG. 12.

The process of clipping areas analyses the dependency graph data structure in order to determine which updated areas of items are visible, and hence need to be redrawn. In many cases, only part of an item's area needs to be redrawn, and in some instances, this area will be obscured, either partially or entirely, by another item. The process of clipping areas 1205 shown in FIG. 12 is detailed in FIG. 15.

The dependency graph is analysed in two stages, comprising steps 1501 to 1504 and steps 1505 to 1513. The first stage analyses the parent nodes of the current item. For example, consider that the user has clicked on button 305 shown in FIG. 3. This is represented in the dependency graph in FIG. 5 as item 508. This item has a parent 504, which is the entire colour control menu. The parent of the colour control menu 504 is the view node 501, that corresponds to the window of the view in a multi-window graphical user interface. The parent of any node in the dependency graph has the characteristic that if an area of the node falls outside of the area of its parent, then that part of it need not be drawn. Steps 1501 to 1504 analyse the parents of each item to determine this type of clipping. At step 1501 the next parent of the item is considered. At step 1502 the area of the item is clipped to that of the currently considered parent. At step 1503 a question is asked as to whether there is any area remaining. If not, no further clipping analysis is performed. If there is some area left, control is directed to step 1504 where a question is asked as to whether the root node 501 of the dependency graph has been reached. If answered in the negative, control is directed to step 1501, where the next parent, ascending up the dependency graph, is identified. In the present example, on the second pass, the parent node will be the root node 501.

Once the root node has been reached, and assuming an area of the current item remains, control is directed to step 1505. The dependency graph is structured such that, on any given level, for example the level that comprises nodes 502, 503, 504, 505 and 506, nodes are drawn from left to right. This results in node 506 being drawn on top of node 505 and so on. Given this condition, the next stage of analysis determines how much of the area of the current item is obscured by nodes to the right of itself, or at other stages of the hierarchy of the dependency graph. This analysis is performed in a top down manner, starting at the root node 501, and working down.

Initially, at step 1505, the root node 501 has been reached. Thus, the next level that is selected is the level that comprises nodes 502 to 506. Also the colour control menu 504 is considered as the current node, as this is the parent of the item that needs to be redrawn. At step 1506 a question is asked as to whether there are any siblings to the right of the current node. Initially there are two of these: nodes 505 and 506. At step 1507 the rightmost of the remaining siblings is selected, and a question is asked at step 1509 as to whether the areas of the sibling 506 or 505 and the current node 504 intersect. If not, control is directed back to step 1506, where any remaining siblings are considered. Alternatively, if the areas do intersect, this indicates that part of the sibling may be covering the item. At step 1509 a question is asked as to whether the sibling covers a corner or a side. If the sibling covers a side, the solution is straightforward. Control is directed to step 1511 where the rectangular area of the item 508 is clipped by the overlapping area of the sibling. When the sibling covers a corner, it is not possible to clip a rectangular area to another rectangle. In the preferred embodiment, instead of splitting up the item's area into a pair of smaller rectangles, the sibling itself is marked for update at step 1510. This results in the corner of the item 508 being drawn and then overdrawn by the sibling 506. This is a simplified solution to avoid complexity.

If the sibling has been marked for update, this includes identifying the overlapping area and adding it to the list of areas for that item. After step 1510, control is directed to step 1506. Alternatively, if the area of the item is clipped at step 1511, control is thereafter directed to step 1512 where a question is asked as to whether there is any area remaining. If so, control is directed to step 1506. If no area remains, there is no need for further analysis of the dependency graph with respect to the area marked for update. If, at step 1506, there are no further siblings to the right of the current node 504, control is directed down to step 1513, where a question is asked as to whether there is another level of the dependency graph for analysis. If not, this represents completion of the area clipping process 1205. Alternatively, control is directed to the next level. In the present example this comprises nodes 507 to 510, of which only 509 and 510 are to the right of the item 508. Steps 1506 to 1512 are then repeated until this final level of area clipping has been completed.

Figure 16:
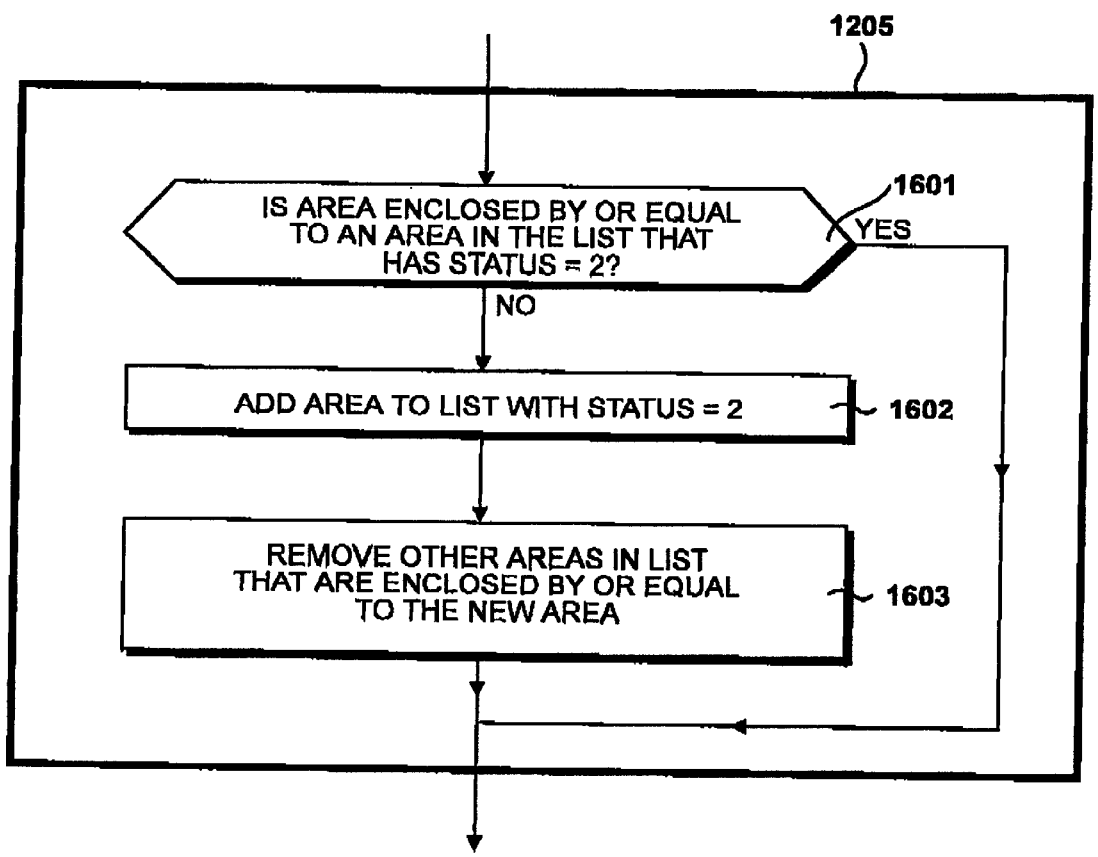
FIG. 16 details the step of adding an area to a list of areas shown in FIG. 12.

The step 1207 for adding an area to the list of areas for an item is detailed in FIG. 16. At step 1601 a question is asked as to whether the new area is enclosed by or equal to an area that is already in the list and which is invalid in both front and back buffers (indicated by a status value of two). If such an area exists, then there is no need to add the new area to the list, as it is due to be redrawn anyway. Alternatively, if no such area meeting these conditions is found, then control is directed to step 1602, where the new area is added to the list and given the status value of two. At step 1603, the other areas in the list are examined to see if there are any that are enclosed by or equal to the newly added area. If any of these areas are found, they are removed from the list, as they will be redrawn in both front and back buffers, when necessary, as a result of the new area being added.

I claim:

1. A method of updating data in a double buffering process, comprising user event-responsive steps and display event-responsive steps;
   (a) said user event-responsive steps comprising:
      (i) in response to a user event, identifyng a condition to the effect that a displayed item requires updating in a front buffer and a back buffer; and
   (b) said display event-responsive steps comprising:
      (i) identifying the displayed item that requires updating,
      (ii) drawing said displayed item in the back buffer,
      (iii) identifying a condition to the effect that said displayed item has been updated in the back buffer, that the displayed item has not been updated in the front buffer, and that the front buffer is invalid;
      (iv) reversing the roles of the front and back buffers, with the invalidity of the displayed item in the front buffer now relating to invalidity of the displayed item in the back buffer; and
      (v) updating said same displayed item in the back buffer:
         (1) only when any item in the front buffer becomes invalid; and
         (2) only after the front buffer becomes the back buffer pursuant to the role reversal.

2. A method according to claim 1, wherein said items are areas.

3. A method according to claim 2 wherein an item includes a list of invalid areas that require updating.

4. A method according to claim 3, wherein each invalid area in said list includes a status for said invalid area.

5. A method according to claim 3, wherein invalid areas are removed from said list when they are valid in both the front buffer and the back buffer.

6. A method according to claim 3, wherein said invalid area is compared with other areas to determine a remaining visible area.

7. A method according to claim 6, wherein said areas for comparison are identified by parsing the list of invalid areas for an item.

8. A method according to claim 6, wherein said areas for comparison are identified by parsing a scene graph.

9. Apparatus for updating items on a double buffered display, induding processing means, instruction storage means and graphical processing means wherein:
   (a) said graphical processing means comprises display double buffering means;
   (b) said processor is configured to perform user event-responsive steps and display event-responsive steps;
   (c) said user event-responsive steps comprise:
      (i) in response to a user event, identifying a condition to the effect that a displayed item requires updating in a front buffer and a back buffer; and
   (d) said display event-responsive steps comprise:
      (i) identifying the displayed item that requires updating,
      (ii) drawing said displayed item only in the back buffer,
      (iii) identifying a condition to the effect that said displayed item has been updated in the back buffer, that the displayed item has not been updated in the front buffer, and the front buffer is invalid;
      (iv) reversing the roles of the front and back buffers, with the invalidity of the displayed item in the front buffer not relating to invalidity of the displayed item in the back buffer; and
      (v) updating said same displayed item in the back buffer:
         (1) only when any item in the front buffer becomes invalid; and
         (2) only after the front buffer becomes the back buffer pursuant to the role reversal.

10. Apparatus according to claim 9, wherein said items are areas.

11. Apparatus according to claim 10, wherein an item includes a list of invalid areas that require updating.

12. Apparatus according to claim 11, wherein each invalid area in said list includes a status for said invalid area.

13. Apparatus according to claim 11, wherein said processing means is further configured to remove invalid areas from said list when they are valid in both the front buffer and the back buffer.

14. Apparatus according to claim 11, wherein said processing means is further configured to compare said invalid area with other areas to determine a remaining area.

15. Apparatus according to claim 14, wherein said processing means is further configured to identify areas for comparison by parsing the list of invalid areas for an item.

16. Apparatus according to claim 14, wherein said processing means is configured to identify areas for comparison by parsing a scene graph.

17. A computer system including processing means, instruction storage means and graphical processing means, wherein said graphical processing means comprises display double buffering means, programmed to execute stored instructions such that in response to said stored instructions said processing means is configured to:
   (a) in response to a user event, identify a condition to the effect that a displayed item requires updating in a front buffer and a back buffer,
   (b) identify the displayed item that requires updating;
   (c) draw said displayed item in the back buffer,
   (d) identify a condition to the effect that said displayed item has been updated in the back buffer, that the displayed item has not been updated in the front buffer, and that the front buffer is invalid;
   (e) reverse the roles of the front and back buffers, with the invalidity of the displayed item in the front buffer now relating to invalidity of the displayed item in the back buffer; and
   (f) updating said same displayed item in the back buffer:
      (i) only when any item in the front buffer becomes invalid; and
      (ii) only after the front buffer becomes the back buffer pursuant to the role reversal.

18. A computer system programmed to execute stored instructions according to claim 17, wherein said items are areas.

19. A computer system programmed to execute stored instructions according to claim 18, wherein an item includes a list of invalid areas that require updating.

20. A computer system programmed to execute stored instructions according to claim 19, wherein each invalid area in said list includes a status for said invalid area.

21. A computer system programmed to execute stored instructions according to claim 19, configured to remove invalid areas from said list when they are valid in both the front buffer and the back buffer.

22. A computer system programmed to execute stored instructions according to claim 19, configured to compare said invalid area with other areas to determine a remaining area.

23. A computer system programmed to execute stored instructions according to claim 22, configured to identify areas for comparison for parsing a list of areas for an item.

24. A computer system programmed to execute stored instructions according to claim 22, configured to identify areas for comparison by parsing a scene graph.

25. A computer-readable medium having computer-readable instructions executable by computer such that, when executing said instructions, a computer performs the steps of:
  (a) in response to a user event, identifying a condition to the effect that a displayed item requires updating in a front buffer and a back buffer;
  (b) identifying the displayed item that requires updating;
  (c) drawing said displayed item only in the back buffer;
  (d) identifying a condition to the effect that said displayed item has been updated in the back buffer, that the displayed item has not been updated in the front buffer, and that the front buffer is invalid;
  (e) reversing the roles of the front and back buffers, with the invalidity of the displayed item in the front buffer now relating to invalidity of the displayed item in the back buffer; and
  (f) updating said same displayed item in the back buffer:
    (i) only when any item in the front buffer becomes invalid; and
    (ii) only after the front buffer becomes the back buffer pursuant to the role reversal.

26. A computer-readable medium having computer-readable instructions according to claim 25, wherein said items are areas.

27. A computer-readable medium having computer-readable instructions according to claim 26, wherein an item includes a list of invalid areas that require updating.

28. A computer-readable medium having computer-readable instructions according to claim 27, wherein each invalid area in said list includes a status for said invalid area.

29. A computer-readable medium having computer-readable instructions according to claim 27, wherein invalid areas are removed from said list when they are valid in both the front buffer and the back buffer.

30. A computer-readable medium having computer-readable instructions according to claim 27, wherein said invalid area is compared with other areas to determine a remaining visible area.

31. A computer-readable medium having computer-readable instructions according to claim 30, wherein said areas for comparison are identified by parsing the list of invalid areas for an item.

32. A computer-readable medium having computer-readable instructions according to claim 30, wherein said areas for comparison are identified by parsing a scene graph.

* * * * *

UNITED STATES PATENT AND TRADEMARK OFFICE
CERTIFICATE OF CORRECTION

PATENT NO. : 6,522,335 B2
DATED : February 18, 2003
INVENTOR(S) : Eric Brown

It is certified that error appears in the above-identified patent and that said Letters Patent is hereby corrected as shown below:

<u>Title page,</u>
Item [56], References Cited, U.S. PATENT DOCUMENTS, insert
-- 5,719,985 * 2/1998 Ito et al
  5,590,381 * 12/1996 Mourad --

<u>Column 11,</u>
Line 47, "induding" should read -- including --

Signed and Sealed this

Nineteenth Day of August, 2003

JAMES E. ROGAN
*Director of the United States Patent and Trademark Office*